United States Patent [19]
Macleod

[11] 3,926,215
[45] Dec. 16, 1975

[54] FLUID CONTROL VALVES

[75] Inventor: Norman Macleod, Edinburgh, Scotland

[73] Assignee: National Research Development Corporation, London, England

[22] Filed: Aug. 3, 1973

[21] Appl. No.: 385,337

[52] U.S. Cl. ................................. 137/527.8; 3/1.5
[51] Int. Cl.[2] ......................................... F16K 15/03
[58] Field of Search ........... 3/DIG. 3, 1.5; 137/527, 137/527.8

[56] References Cited
UNITED STATES PATENTS

| | | | |
|---|---|---|---|
| 1,744,798 | 1/1930 | Price | 137/527 |
| 2,711,188 | 6/1955 | Nickerson | 137/527.8 |
| 2,781,054 | 2/1957 | Neumann | 137/527.8 |
| 2,888,036 | 5/1959 | Reppert | 137/527.8 X |
| 2,900,998 | 8/1959 | Lortz | 137/527.8 X |
| 2,928,697 | 3/1960 | Bennett | 137/527.8 X |
| 3,290,001 | 12/1966 | Taylor | 137/527.8 X |
| 3,327,732 | 6/1967 | Deve | 137/527.8 |
| 3,352,318 | 11/1967 | Yanowitz | 137/527.8 X |

FOREIGN PATENTS OR APPLICATIONS

| | | | |
|---|---|---|---|
| 394,221 | 6/1933 | United Kingdom | 137/527 |
| 1,305,717 | 8/1962 | France | 137/527 |

*Primary Examiner*—Robert G. Nilson
*Attorney, Agent, or Firm*—Cushman, Darby & Cushman

[57] ABSTRACT

A fluid control valve suited to use as a prosthetic heart valve, has an annular seat member, and a disc, shaped in plan view to correspond with the radially inner portion of a transverse section of the seat, pivotally mounted in the seat for movement to and from a closure position. The disc is pivoted in off-set manner to define smaller and larger disc portions on opposite sides of the pivot axis, and has a non-symmetrical aerofoil cross-sectional shaping perpendicular to this axis with leading and trailing edges respectively located in the disc portions. Normally the seat inner portion will be longitudinally convergent, preferably conically or hyperboloidally so, and the disc will be elliptic.

6 Claims, 6 Drawing Figures

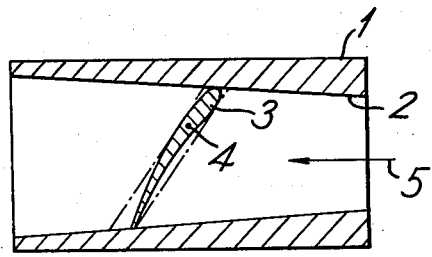
Fig. 1
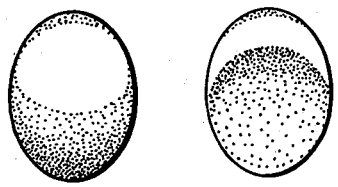
Fig. 2a   Fig. 2b
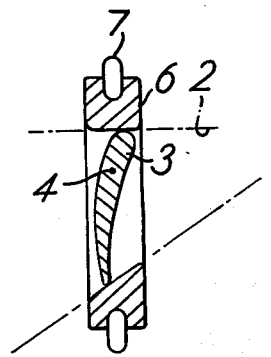   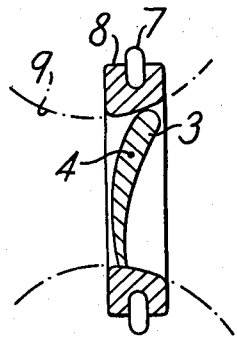   
Fig. 3   Fig. 4   Fig. 5

FLUID CONTROL VALVES

This invention concerns fluid control valves and more particularly, but not exclusively, such valves suitable for use as prosthetic heart valves.

A fluid control valve according to the present invention comprises an annular seat member defining a fluid flow passageway therethrough, and a disc shaped in plan view to correspond with the radially inner portion of a transverse section of said seat member, said disc being pivotally mounted within said seat member for movement, about an axis through the seat, to and from a position in which the disc closes said passageway, said axis defining smaller and larger disc portions on opposite sides thereof, and said disc having non-symmetrical aerofoil cross-sectional shaping in a direction perpendicular to said axis to define leading and trailing edges respectively located in said smaller and larger disc portions.

Normally the radially inner portion of the seat member will be axially convergent and the disc member will be substantially elliptic in plan view. Also, the aerofoil shaping is preferably such that the mass of the disc is balanced about its pivotal axis, and such shaping will normally involve a concave disc surface of the seat member passageway.

For a clearer understanding of the invention the same will now be described by way of example with reference to the accompanying drawings in which:

FIG. 1 schematically illustrates a longitudinal section view of one embodiment of a valve according to the present invention;

FIGS. 2a and 2b respectively illustrate in plan and bottom views the valve disc of FIG. 1;

FIGS. 3 and 4 schematically illustrate in longitudinal sectional views respectively different further embodiments of valves according to the present invention; and FIG. 5 illustrates in longitudinal section a modified form of a valve disc suitable for use in the present invention.

The valve embodiment of FIG. 1 has a tubular body 1 having a frusto-conical passageway 2 therethrough housing a disc 3 as a substantially elliptic section when the valve is closed, as shown. The disc 3 can be regarded as formed to have an aerofoil section by shaping from a blank which is defined by the two parallel planes denoted in broken line and the passageway 2. In fact the disc of a prototype valve development of the invention was produced by removal of material from such a blank, removal being effected in the shaded areas of the disc as shown in respective views of FIGS. 2a and 2b from the diverging and converging ends of the passageway. Clearly such shaping may result in the disc having a periphery which is not absolutely elliptic, but the disc can still assume a sealing disposition as shown providing that its periphery is wholly defined by that of the original blank.

The disc is mounted in the passageway 2 for pivotal movement about an axis 4 which is parallel to, but spaced towards the converging end of the passageway from, and towards the leading edge of the disc aerofoil section from, the minor axis of the relevant elliptic shaping. Accordingly, the pivot axis effectively separates the disc into smaller and larger portions and, while pivotal movement of such a disc to and from the illustrated closure position could not occur in a cylindrical passageway, such movement can occur in the illustrated conical passageway by virtue of the convergent form of the passageway and the relation of the disc therewith.

Considering the functioning of the valve in more detail relative to a normal fluid flow along the passageway 2 in the direction of arrow 5; the off-setting of the axis 4 relative to the minor axis of the disc results in the fluid pressure differential applying a moment or torque to rotate the disc in a clockwise sense about its axis, so opening the valve, and this rotation is permitted by the fact that the larger disc portion, below the axis 4 can move into the diverging part of the passageway 2. As the valve opens and flow is established, this turning moment, initially due to the fluid pressure, is augmented by effects due to drag and lift. The lift arises by virtue of the aerofoil section of the disc, which should be of such a form that the centre of pressure of the fluid dynamic forces is always correctly located with respect to the pivot to ensure that the lift force (which in FIG. 1 would be directed upwards) assists in opening the valve at all stages of rotation of the disc. Thus the center of pressure will be in the larger, trailing end portion of the disc relative to the axis 4 to thereby provide a lift moment which assists opening of the valve. In the result the disc can attain a position in, or close to, alignment with the axis of flow (i.e. horizontal in FIG. 1), where the aerofoil section is further advantageous in affording a relatively streamlined fluid flow.

If now the fluid flow is reversed, the aerofoil section is arranged to give rise to a lift which is oppositely directed but which acts at a centre of pressure on the same side of the pivot as before and so initiates anti-clockwise rotation of the disc; this rotation is progressively assisted by drag as the disc turns towards the closed position. After flow has been arrested by valve closure, sealing of the disc edges against the wall of the housing is promoted by the differential hydrostatic pressure force across the faces of the disc, the resultant of which pressure has a finite moment about the off-set pivotal axis. So the valve is closed against return flow by an effective reverse of the valve opening action.

While the valve just described functions in a manner which can be advantageous in various applications, it is not directly applicable to use as a prosthetic heart valve by virtue of its proportions. However, the illustrated valve forms a basis for a prosthetic heart valve by use of the longitudinal portion thereof which embraces the disc.

This is illustrated by FIG. 3 which shows the valve of FIG. 1 longitudinally shortened in this way, with the resultant annular seat member 6 longitudinally rounded at its radially inner periphery to afford hydrodynamic fairing, and circumferentially grooved around its radially outer periphery for securement with a suture ring 7 therein.

It is to be noted that the valve of FIG. 3 will be normally of elliptic overall form and is particularly suited for use as a prosthetic mitral valve since the site of the natural mitral valve is substantially elliptic. The relevant site in fact normally has a ratio of major to minor axis in the range 1 to 1.3, and similar proportions of elliptical shaping can be attained by design of the valve annular seat member at an inclination of about 45° relative to the longitudinal axis of the conical passageway from which the seat member geometry is effectively derived.

While essentially the same valve form is also suitable for other prosthetic heart valve application, it is preferred that a modified form be used for the other valve of greatest likely interest, namely, the aortic valve. The reason for this is that the site of the aortic valve is substantially circular.

Now it will be appreciated that the derivation of a valve of circular overall form from FIG. 1 involves consideration of a substantially perpendicular cross-sectioning to embrace the disc. Also, insofar as the longitudinal extent of the desired valve should be short relative to its overall diameter, the inclination of the disc to planes normal to the axis of the valve seat will not be great when closing the same. It then follows that the angle of divergence of the conical shaping in the seat must be small. These conditions lead to a situation whereby an aortic valve based on FIG. 1 can involve disposition of the disc in the seat to effect closure by way of a seal over a limited interface area nearly parallel to the longitudinal axis of the valve. The seat is then nearly cylindrical and its generators meet the plane of the disc at angles nowhere very different from 90°. The clearances allowing the disc to open in the required manner are therefore correspondingly small and might be difficult to maintain in quantity production in the face of normal manufacturing tolerances.

In these circumstances, it is preferred to adopt a modified geometry for the valve seat whereby the radially inner surface is derived from a hyperboloid. This is illustrated by FIG. 4 in which the seat member 8 is derived from a hyperboloid denoted in broken line at 9. The disc 3 is again inclined relative to the longitudinal axis of the valve and is normally accordingly elliptic. Also, the disc is of aerofoil sectional form and pivotally mounted at 4 in off-set manner, as before. However, a difference arises relative to the conical derivation of FIG. 3 in that, in the case of FIG. 4, the disc arranged to make a small angle with the normal cross-section of the hyperboloidal passageway when occluding the same, while at the same time meeting the generators of such passageway at angles substantially different from 90° around most of its perimeter. The clearances allowing disc rotation within this passageway can consequently be relatively large. Indeed, in principle, the disc can be located in the throat of a hyperboloidal passageway so that both the larger and smaller portions of the disc relative to the pivotal axis move from the closure position into divergent zones of the valve passageway, but this presents serious difficulties in manufacture. Also, derivation from a hyperboloid implicitly provides a degree of longitudinal rounding and hydrodynamic fairing at the radially inner periphery of the seat member.

Whatever the form of the valve according to the invention, application of the same as a prosthetic heart valve requires manufacture from medically as well as mechanically suitable materials. At present, it is preferred for this purpose that the seat member and disc be made of vitreous carbon, or from a substrate, such as graphite, coated with pyrolitic carbon, although these more specific materials are not exclusive of other possibilities.

It is also appropriate to consider the advantages of the invention in application to prosthetic heart valves. Various other valve forms have been proposed previously for this purpose, but those best adapted to fabrication in the most athrombogenic and durable materials at present known (which happen to be rigid materials) suffer from various defects, including: a liability to promote thrombus formation and haemolysis, probably as a result of the occurrence of stagnant zones and regions of low pressure in the fluid downstream of the valving element or its seat; an excessive opening-pressure requirement; sluggish opening action, due to large inertia effects, increasing the required work output of the heart; excessive flow resistance, associated with an insufficient orifice or unfavourable form of flow passage; and delayed or imperfect closure, causing regurgitation. The presently proposed valves can at least reduce these defects.

The principal advantageous features of the proposed valves are: 1. The walls of the flow passage can be smoothly continuous and uninterrupted by any protrusion such as might cause harmful stasis or pressure loss downstream; 2. The valving element or disc is so contrived as to offer little resistance to, or disturbance of, the forward flow when fully open, but is acted on by large fluid mechanical forces when in the closed or partially closed position. The forces engendered by a forward flow or pressure gradient tend to open the valve rapidly to its fullest extent. The forces associated with a reverse flow or pressure gradient cause rapid and firm closure.

The opening-pressure requirement is clearly low since the only resistance to be overcome by the differential pressure action about the pivotal axis is that due to the inertia of the disc and arising from friction in a portion of the surrounding fluid and in the pivotal mounting. The flow-resistance need not be high since the aerofoil section can assist in streamlining the flow, and the passageway need not be modified from a regular form by the provision of recesses to facilitate rotation of the disc or protrusions to assist sealing when the valve is closed. Also, the normal flow from the valve is in the direction in which the passageway diverges, resulting in increasing pressure and, therefore, less likelihood of oxygen or other gas being released from solution. Lastly, the closing action is not delayed or slow, since the inertia of the moving part can be made small and the effective torque large. Nor need the closure be unsatisfactory, since the sealing area is continuous and may be made as extensive as is desired; i.e. there is area contact, not merely line contact, between disc and seat.

While the invention has been described with more particular reference to the illustrated examples, and prosthetic heart valve application, it is not intended to be limited thereby. Clearly, the valve can find advantageous application in uses related to prosthetic heart valves, such as in heart by-pass equipment, blood oxygenators, and like equipment for handling body fluids, and the requirements for overall form are then relieved to the extent that valve forms such as that of FIG. 1 are viable. Also, in the same way that valve seat geometry is variable, so is that of the disc aerofoil section, and other forms suitable to afford the desired functional characteristics may incorporate a flow spoiler adjacent the leading edge as indicated at 10 in FIG. 5, instead of the more conventional aerofoil form of the other figures involving smooth convex and concave faces.

I claim:

1. A fluid control valve comprising a smooth annular seat member defining a fluid flow passageway therethrough, and a disc shaped in plan view to correspond with the radially inner portion of a transverse section of said seat member for movement about an axis through the seat member and disc to and from a position in which the disc closes said passageway, said axis defining smaller and larger disc portions on opposite sides thereof wherein the mass of said disc is substantially balanced about said pivotal axis, said disc having a non-symmetrical aerofoil cross-sectional shaping in a direction perpendicular to said axis to define leading and trailing edges respectively located in said smaller and larger disc portions, said aerofoil shaping of said disc including a concave surface on one side of said disc and a convex surface on the other side thereof, and said shaping defining respective centers of pressure which are both located in said larger portion of said disc in respect to fluid flow in opposite directions through said shaping, said shaping rendering said disc self-stabilized in its open position.

2. A valve according to claim 1 wherein said radially inner portion is longitudinally convergent, and said disc is substantially elliptic in plan view.

3. A valve according to claim 2 wherein said radially inner portion is substantially part-conically shaped.

4. A valve according to claim 3 wherein said passageway terminates at the ends of said valve seat in substantially parallel planes which are obliquely inclined to the longtudinal axis of said conical shaping and said disc is disposed approximately parallel to said planes when closing said passageway.

5. A valve according to claim 4 wherein said planes are inclined at about 45° to said longitudinal axis.

6. A valve according to claim 2 wherein said concave surface is nearer the narrower end of said radially inner portion when closed by said disc.

* * * * *